US012789846B2

(12) United States Patent
Park et al.

(10) Patent No.: US 12,789,846 B2
(45) Date of Patent: Nov. 10, 2026

(54) VEHICLE FOR PERFORMING MINIMAL RISK MANEUVER AND METHOD OF OPERATING THE VEHICLE

(71) Applicants: Hyundai Motor Company, Seoul (KR); Kia Corporation, Seoul (KR); Ajou University Industry-Academic Cooperation Foundation, Suwon-si (KR)

(72) Inventors: Jong Sung Park, Hwaseong-si (KR); Young Bin Min, Busan (KR); Cheol Hwan Yun, Seoul (KR); Chan Jong Jang, Daegu (KR); Bong Sob Song, Seongnam-si (KR); Ji Min Lee, Hwaseong-si (KR); Sung Woo Lee, Hwaseong-si (KR)

(73) Assignees: Hyundai Motor Company, Seoul (KR); Kia Corporation, Seoul (KR); Ajou University Industry-Academic Cooperation Foundation, Suwon-si (KR)

(*) Notice: Subject to any disclaimer, the term of this patent is extended or adjusted under 35 U.S.C. 154(b) by 297 days.

(21) Appl. No.: 18/334,812

(22) Filed: Jun. 14, 2023

(65) Prior Publication Data

US 2023/0406354 A1 Dec. 21, 2023

(30) Foreign Application Priority Data

Jun. 16, 2022 (KR) ........................ 10-2022-0073494

(51) Int. Cl.

| | |
|---|---|
| ***B60W 60/00*** | (2020.01) |
| ***B60W 30/09*** | (2012.01) |

(Continued)

(52) U.S. Cl.

CPC ........ *B60W 60/0015* (2020.02); *B60W 30/09* (2013.01); *B60W 30/18163* (2013.01); *B60W 40/06* (2013.01); *B60W 2552/05* (2020.02)

(58) Field of Classification Search

CPC ...... B60W 10/04; B60W 10/10; B60W 10/18; B60W 10/20; B60W 2050/0005;

(Continued)

(56) References Cited

U.S. PATENT DOCUMENTS

| | | | | |
|---|---|---|---|---|
| 10,152,056 | B2 | 12/2018 | Rohde et al. | |
| 2018/0029604 | A1* | 2/2018 | Niino .................. | B60W 30/181 |

(Continued)

FOREIGN PATENT DOCUMENTS

| | | | |
|---|---|---|---|
| DE | 102015220360 | A1 | 4/2017 |
| DE | 112021005727 | T5 | 9/2023 |

(Continued)

OTHER PUBLICATIONS

Machine Translation of KR 20220010697 A obtained from Clarivate Analytics on May 16, 2025 (Year: 2022).*

*Primary Examiner* — Fadey S. Jabr
*Assistant Examiner* — Michael J Herrera
(74) *Attorney, Agent, or Firm* — Slater Matsil, LLP

(57) ABSTRACT

An embodiment method of operating a vehicle includes generating a minimal risk maneuver request of the vehicle in response to a determination that there is an abnormality in a state of the vehicle, in response to the minimal risk maneuver request being generated, selecting a minimal risk maneuver type from among a plurality of minimal risk maneuver types based on the state of the vehicle, and performing a minimal risk maneuver based on the selected minimal risk maneuver type.

12 Claims, 6 Drawing Sheets

(51) Int. Cl.
*B60W 30/18* (2012.01)
*B60W 40/06* (2012.01)

(58) Field of Classification Search
CPC ..... B60W 2050/009; B60W 2050/146; B60W 2420/403; B60W 2420/408; B60W 2520/04; B60W 2552/05; B60W 2552/20; B60W 2552/53; B60W 2556/45; B60W 2710/18; B60W 2710/20; B60W 30/09; B60W 30/0956; B60W 30/181; B60W 30/18163; B60W 40/02; B60W 40/06; B60W 50/02; B60W 50/14; B60W 60/0011; B60W 60/0015; B60W 60/0018; G06V 10/25

See application file for complete search history.

(56) References Cited

U.S. PATENT DOCUMENTS

| | | | | |
|---|---|---|---|---|
| 2019/0135291 | A1* | 5/2019 | Sim | B60W 10/188 |
| 2020/0094850 | A1* | 3/2020 | Chi | G05D 1/617 |
| 2020/0201323 | A1 | 6/2020 | Park | |
| 2021/0294336 | A1* | 9/2021 | Maus | G05D 1/0214 |
| 2022/0340130 | A1* | 10/2022 | Motoyama | G08G 1/165 |
| 2022/0410877 | A1* | 12/2022 | Ishida | G08G 1/147 |
| 2023/0249686 | A1* | 8/2023 | Sugimoto | B60W 50/14 701/70 |
| 2023/0347939 | A1* | 11/2023 | Nakano | B60W 60/0015 |
| 2023/0382371 | A1 | 11/2023 | Park et al. | |
| 2025/0065919 | A1* | 2/2025 | Yu | G07C 5/008 |

FOREIGN PATENT DOCUMENTS

| | | | |
|---|---|---|---|
| KR | 20220010697 | A * | 1/2022 |
| WO | 2022092684 | A1 | 5/2022 |

* cited by examiner

FIG. 2

| Category | Stopping-in-safety zone | | | | Emergency-stopping | |
|---|---|---|---|---|---|---|
| Type | Type 1 | Type 2 | Type 3 | Type 4 | Type 5 | Type 6 |
| | Stopping-completely-on shoulder | Stopping-half-on shoulder | Stopping-on-road merge point | Stopping-on-highway entrance merge point | Straight-stopping | In-lane stopping |
| Example | 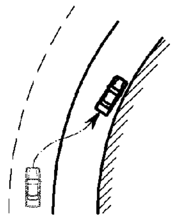 | 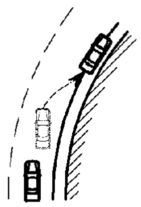 | 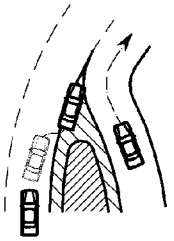 | 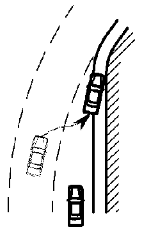 |  | 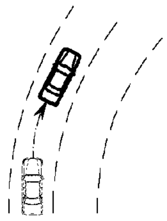 |
| Braking Control | Capable | Capable | Capable | Capable | Capable | Capable |
| Lateral Control | Capable | Capable | Capable | Capable | Not Capable | Capable |
| Lane Detection | Capable | Capable | Capable | Capable | Not Capable | Capable |
| Shoulder Detection | Capable | Capable | Capable | Capable | Not Capable | Not Capable |

VEHICLE FOR PERFORMING MINIMAL RISK MANEUVER AND METHOD OF OPERATING THE VEHICLE

CROSS-REFERENCE TO RELATED APPLICATIONS

[spool] This application claims the benefit of Korean Patent Application No. 10-2022-0073494, filed on Jun. 16, 2022, which application is hereby incorporated herein by this reference.

TECHNICAL FIELD

Various embodiments relate to a vehicle for performing a minimal risk maneuver and a method of operating the vehicle.

BACKGROUND

Recently, advanced driver assistance systems (ADAS) are being developed to assist a driver with operating a vehicle. The ADAS has multiple sub-technology categories and may provide convenience to a driver. Such ADAS is also called an autonomous driving system or an ADS for "automated driving system."

Meanwhile, when a vehicle performs autonomous driving, an unexpected accident or event may occur, and the vehicle may be in a critical state if an appropriate response to minimize the risk of collision with a nearby vehicle is not performed for such an event.

SUMMARY

Various embodiments relate to a vehicle for performing a minimal risk maneuver and a method of operating the vehicle. Particular embodiments relate to a vehicle for performing a minimal risk maneuver for minimizing a risk of collision with a nearby vehicle when an unexpected accident or event occurs while traveling on a highway and a method of operating the vehicle.

Various embodiments of the present disclosure may provide a method of selecting a minimal risk maneuver type for minimizing a risk of collision with a neighboring vehicle and stopping a vehicle in a safety zone for an event that occurs during autonomous driving of the vehicle on a highway.

In addition, various embodiments of the present disclosure may provide a method of finding a safety zone in which a vehicle can stop through a minimal risk maneuver.

Technical problems solvable by embodiments of the disclosure are not limited to the technical problems mentioned above, and other technical problems not mentioned above can be clearly understood by those of ordinary skill in the art to which the present invention belongs from the description below.

According to various embodiments of the present disclosure, a method of operating a vehicle may include generating a minimal risk maneuver request of the vehicle in response to a determination that there is an abnormality in a state of the vehicle, in response to the minimal risk maneuver request being generated, selecting a minimal risk maneuver type from among a plurality of minimal risk maneuver types based on a state of the vehicle, and performing a minimal risk maneuver based on the selected minimal risk maneuver type.

According to various embodiments of the present disclosure, a vehicle may include a sensor configured to detect state information of components of the vehicle and surrounding environment information of the vehicle, a processor configured to monitor a state of the vehicle based on information from the sensor and to control autonomous driving of the vehicle, generate a minimal risk maneuver request of the vehicle in response to a determination that there is an abnormality in the state of the vehicle, select a minimal risk maneuver type from among a plurality of minimal risk maneuver types based on the state of the vehicle in response to generation of the minimal risk maneuver request and perform a minimal risk maneuver according to the selected minimal risk maneuver type; and a controller configured to control an operation of the vehicle according to a control of the processor.

According to various embodiments of the present disclosure, the plurality of minimal risk maneuver types may include a stopping-in-safety zone type in which the vehicle is configured to stop after traveling to a safety zone where a risk of collision of the vehicle is minimized.

According to various embodiments of the present disclosure, the stopping-in-safety zone type may include a stopping-completely-on shoulder type, a stopping-half-on shoulder type, a stopping-on-road merge point type, and a stopping-on-highway entrance merge point type.

According to various embodiments of the present disclosure, selecting the minimal risk maneuver type from among the plurality of minimal risk maneuver types may include searching for safety zones, selecting one safety zone among the found safety zones, and selecting a minimal risk maneuver type according to a type of the selected safety zone.

According to various embodiments of the present disclosure, the searching for the safety zones may include determining a shoulder as a safety zone based on a width of the shoulder being greater than a preset first threshold value. According to an embodiment, the first threshold value may be set to be a width of the vehicle—a maximum allowable width of invasion into a driving lane +0.75 m.

According to various embodiments of the present disclosure, the searching for the safety zones may include determining as a safety zone a stopping-half-on shoulder type when the width of the shoulder is less than a width of the vehicle +0.75 m and determining as a safety zone a stopping-completely-on shoulder type when the width of the shoulder is greater than a width of the vehicle +0.75 m.

According to various embodiments of the present disclosure, the searching for the safety zones may include determining a road merge point as one of the safety zones based on a distance between nearest driving lanes of two roads before the road merge point is greater than a preset second threshold.

According to various embodiments of the present disclosure, the searching for the safety zones may include determining the road merge point as one of the safety zones based on a distance between the nearest driving lanes of the two roads before the road merge point being greater than the preset second threshold and a distance from the road merge point to a location where the distance is greater than the preset second threshold value being less than or equal to a preset third threshold value.

According to various embodiments of the present disclosure, the searching for the safety zones may include determining as a safety zone the road merge point when a distance of invasion to a left driving lane is less than a width of the left driving lane ($W_L$)—a maximum width of the vehicle ($W_v$)—0.75 m and a distance of invasion to a right driving lane is less than a width of the right driving lane ($W_R$)—a maximum width of the vehicle ($W_v$)—0.75 m.

According to various embodiments of the present disclosure, the searching for the safety zones may include determining as a safety zone a highway entrance merge point when a sum of widths of a shoulder and an entry lane is greater than a preset forth threshold value, and a distance from a final merge point, where the entry lane merges with a driving lane and thus ended, to the location where the sum is greater than the preset forth threshold is less than or equal to a preset fifth threshold value.

According to various embodiments of the present disclosure, searching for the safety zones may include searching for the safety zone only within a region of interest of the vehicle.

According to various embodiments of the present disclosure, selecting the one safety zone among the found safety zones may include selecting the safety zone having a closest distance among the found safety zones.

According to various embodiments of the present disclosure, selecting the one safety zone among the found safety zones may include selecting the safety zone having a highest priority among the found safety zones based on a priority set according to a type of the safety zone.

According to various embodiments of the present disclosure, the plurality of minimal risk maneuver types may include an emergency-stopping type in which the vehicle stops prior to traveling to the safety zone, and the emergency-stopping type may include a straight-stopping type and an in-lane stopping type.

According to various embodiments of the present disclosure, selecting the one among the plurality of minimal risk maneuver types may include selecting the stopping-in-safety zone type based in the vehicle being capable of performing a braking control, a lateral control, a lane detection, and a shoulder detection, selecting the in-lane stopping type based in the vehicle being capable of performing the braking control and the lateral control but not the lane detection and the shoulder detection, and selecting the straight-stopping type based in the vehicle being capable of performing the braking control but not the lateral control, the lane detection, and the shoulder detection.

According to various embodiments of the present disclosure, even if the vehicle is in a critical state due to an event such as a failure occurring during autonomous driving, a minimal risk maneuver capable of removing the critical situation may be performed. Accordingly, the vehicle advantageously can escape from the critical state and its state can be changed to a state of minimum criticalness, and thereby driving stability of the vehicle can be further increased.

Effects obtainable by embodiments of the present disclosure are not limited to the above-mentioned effects, and other effects which are not described herein will become apparent to those skilled in the art from the following description.

BRIEF DESCRIPTION OF THE DRAWINGS

FIG. 2 is a view illustrating minimal risk maneuver types according to various embodiments.

In connection with the description of the drawings, the same or similar reference numerals may be used for the same or similar components.

DETAILED DESCRIPTION OF ILLUSTRATIVE EMBODIMENTS

Hereinafter, various embodiments will be described in detail with reference to the accompanying drawings.

With respect to a plurality of embodiments described in the present disclosure, each embodiment may be an independent embodiment, but if they do not conflict with each other, two or more embodiments may be combined and implemented.

Figure 1:
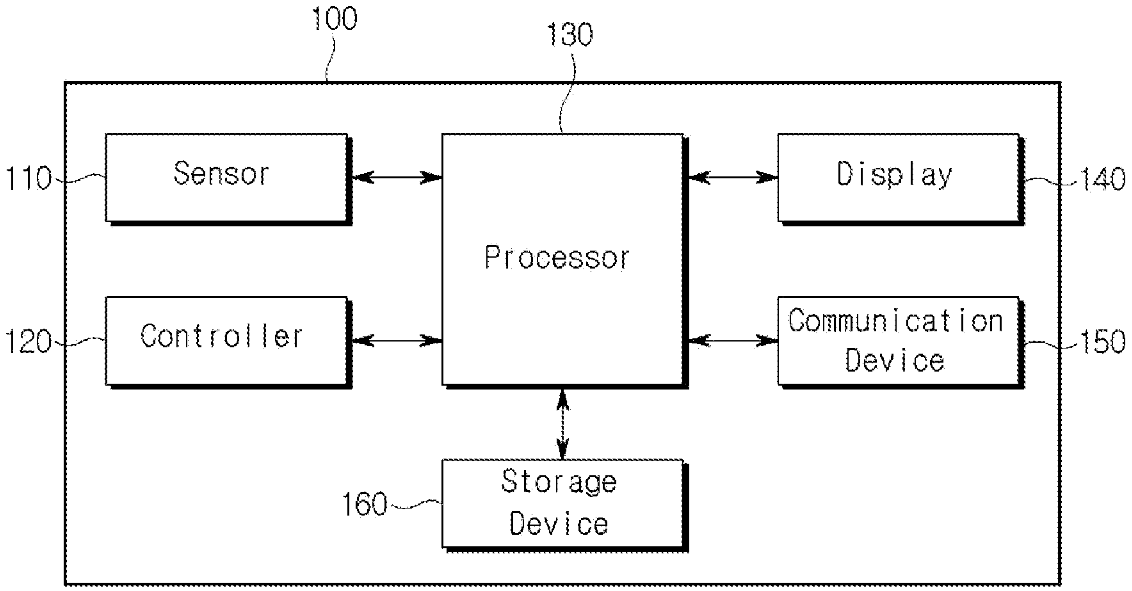
FIG. 1 is a view illustrating a conceptual structure of a vehicle according to various embodiments of the present disclosure.

FIG. 1 is a view illustrating a conceptual structure of a vehicle according to various embodiments of the present disclosure.

Referring to FIG. 1, a vehicle 100 may support autonomous driving. According to embodiments, the vehicle 100 may perform steering, acceleration, braking, shifting, or parking without a driver's operation and may drive under the driver's control when the driver intervenes in the operation. For example, the vehicle 100 may mean a vehicle capable of performing autonomous driving at a level 3 or higher according to the Society of Automation Engineers (SAE), but the present disclosure is not limited thereto.

For example, the autonomous driving described herein may include at least one of ADS functions such as a pedestrian detection and collision mitigation system (PDCMS), a lane change decision aid system (LCDAS), a lane departure warning system (LDWS), an adaptive cruise control (ACC), a lane keeping assistance system (LKAS), a road boundary departure prevention system (RBDPS), a curve speed warning system (CSWS), a forward vehicle collision warning system (FVCWS), a low speed following (LSF), etc.

The vehicle 100 may include a sensor no, a controller 120, a processor 130, a display 140, a communication device 150, and a storage device 160.

The sensor 110 may sense a surrounding environment of the vehicle 100 and generate data related to surroundings of the vehicle 100. According to embodiments, the sensor no may include at least one of a camera, a light detection and ranging (LIDAR) sensor, a radio detection and ranging (RADAR) sensor, and a position sensor.

The camera may photograph the surroundings of the vehicle 100 and generate an image of the surroundings of the vehicle 100 according to the photographing result. The camera may detect the front, rear, and/or side directions of the vehicle 100 and may generate image data according to the detection result. For example, the camera may generate image data for other objects (e.g., other vehicles, people, objects, lanes, or obstacles) in the front, rear, and/or side directions of the vehicle 100.

According to embodiments, the camera may include an image sensor, an image processor, and a camera MCU. For example, the image sensor may sense an image of a subject photographed through a lens, the image processor may receive and process the data from the image sensor, and the camera MCU may receive the data from the image processor.

The LIDAR sensor may detect the front, rear, and/or side directions of the vehicle 100 using light or a laser and may generate detection data according to the detection result. For example, the LIDAR sensor may detect or recognize other objects (e.g., other vehicles, people, objects, lanes, or obstacles) located in the front, rear, and/or side directions of the vehicle 100.

According to embodiments, the LIDAR sensor may include a laser transmission module, a laser detection module, a signal collection and processing module, and a data transmission and reception module, and the light source of the laser may be a light source having a wavelength within a wavelength range of 250 nm to 11 μm or a wavelength-tunable laser. In addition, the LIDAR sensor may be divided into a time of flight (TOF) method and a phase shift method according to a signal modulation method.

The RADAR sensor may detect the front, rear, and/or side directions of the vehicle 100 using electromagnetic waves (or radio waves) and may generate detection data according to the detection result. For example, the RADAR sensor may detect or recognize other objects (e.g., other vehicles, people, objects, lanes, or obstacles) located in the front, rear, and/or side directions of the vehicle 100.

The RADAR sensor may detect an object up to 150 m ahead at a horizontal angle of 30 degrees using a method of frequency modulation carrier wave (FMCW) or pulse carrier. The RADAR sensor may process data generated according to the detection result, and such processing may include magnifying the sensed front object or focusing on an area of the object out of the entire field of view.

The position sensor may measure a current position of the vehicle boo. According to embodiments, the position sensor may include a GPS sensor, and the GPS sensor may measure the position, speed, and current time of the vehicle 100 using communication with a satellite. According to embodiments, the GPS sensor may measure a delay time of a radio wave emitted from a satellite and obtain a position of the vehicle 100 from a distance from an orbit of the satellite.

The controller 120 may control an operation of the vehicle 100 according to a control of the processor 130. According to embodiments, the controller 120 may control steering, driving, braking, and shifting of the vehicle 100. For example, the controller 120 may control each component for performing the steering, driving, braking, and shifting of the vehicle boo.

The controller 120 may control steering of the vehicle 100 according to the control of the processor 130. According to embodiments, the controller 120 may perform a control for a motor driven power steering (MDPS) system that drives a steering wheel. For example, when a collision of a vehicle is expected, the controller 120 may control the steering of the vehicle in a direction that can avoid the collision or minimize damage.

The controller 120 may control the driving of the vehicle 100 according to the control of the processor 130. According to embodiments, the controller 120 may perform deceleration or acceleration of the vehicle 100 or turning on/off of an engine. For example, the controller 120 may perform acceleration or deceleration according to the control of the processor 130 and may perform turning on/off of the engine at the start or end of the driving of the vehicle.

Also, the controller 120 may control the traveling of the vehicle 100 without the driver's control. For example, the controller 120 may perform autonomous driving of the vehicle 100 according to the control of the processor 130.

The controller 120 may control a brake of the vehicle 100 according to the control of the processor 130. According to embodiments, the controller 120 may control whether to operate the brake of the vehicle 100 and control a pedal effort of the brake. For example, the controller 120 may control to automatically operate an emergency brake when a collision is expected.

The processor 130 may control an overall operation of the vehicle 100. The processor 130 may be an electrical control unit (ECU) capable of integrally controlling components in the vehicle 100. For example, the processor 130 may include a central processing unit (CPU) or micro processing unit (MCU) capable of performing arithmetic processing. In addition, there may be at least one processor 130, and in this case, each processor 130 independently operates different functions to control components in the vehicle 100, or according to another embodiment, they are associated with each other with exchanging data to integrally control the components in the vehicle 100.

The processor 130 may perform a determination related to the control of the vehicle 100 and may control the controller 120 according to the determination result. According to embodiments, the processor 130 may receive data from the sensor 110 and generate a control command for controlling the controller 120 based on the received data. The processor 130 may transmit the control command to the controller 120. In addition, the processor 130 may receive a driver's input or control and control the controller 120 according to the driver's input.

Meanwhile, in the above description, there has been a description under the assumption that the controller 120 and the processor 130 are separate components, but according to embodiments, the controller 120 and the processor 130 may be integrated as one component. For example, the controller 120 and the processor 130 may be integrated as one device and work together.

The display 140 may visually display information related to the vehicle 100. According to embodiments, the display 140 may provide various information related to the vehicle 100 to the driver of the vehicle 100 according to the control of the processor 130. For example, the display 140 may visually display a current state of the vehicle 100 according to the control of the processor 130.

The communication device 150 may communicate with an outside of the vehicle 100. According to embodiments, the communication device 150 may receive data from the outside of the vehicle 100 or transmit data to the outside of the vehicle 100 according to the control of the processor 130. For example, the communication device 150 may perform communication using a wireless communication protocol or a wired communication protocol.

For example, the vehicle 100 may communicate with another vehicle (vehicle to vehicle) or with infrastructure (vehicle to infra) using the communication device iso.

The storage device 160 may store programmed software and various setting information required for the processor 130 to be operated. The processor 130 may operate by reading a software code from the storage device 160 when the vehicle is started or the power is turned on. In addition, the processor 130 may temporarily store input and output data generated during operation in the storage device 160.

When an event such as an unexpected accident occurs while the vehicle having the conceptual structure of a vehicle as shown in FIG. 1 is performing autonomous driving, the autonomous driving function of the vehicle urgently needs to try stopping to minimize the risk of collision with a nearby vehicle.

In embodiments of the present disclosure, there are suggested minimal risk maneuver types that can be attempted by a vehicle performing autonomous driving on a highway, and there are provided a device and a method for determining which minimal risk maneuver type should be used according to a state of the vehicle.

FIG. 2 is a view illustrating minimal risk maneuver types according to various embodiments.

Referring to FIG. 2, the minimal risk maneuver types may be largely categorized into a stopping-in-safety zone and an emergency-stopping. The emergency-stopping corresponds to a stopping in an emergency situation in which it is difficult for the vehicle to drive to the safety zone, and when the vehicle can drive to a highway safety zone, a stopping-in-safety zone may be performed. Here, the safety zone may mean an area in a minimum risk condition (MRC) where a risk of collision of the vehicle may be minimized.

The emergency-stopping may include a straight-stopping (type 5) and an in-lane stopping (type 6). When the vehicle 100 is capable of performing only a braking control, it can perform only the straight-stopping, and when the vehicle 100 is capable of performing a braking control, a lateral control, and additionally a lane detection, but is not capable of a shoulder detection, it may perform the in-lane stopping.

The stopping-in-safety zone means stopping after the vehicle 100 drives to a safety zone in a highway and may include at least one of a stopping-completely-on shoulder (type 1), a stopping-half-on shoulder (type 2), a stopping-on-road merge point (type 3), and a stopping-on-highway entrance merge point (type 4). The above-mentioned classification of the types is set according to the typical safety zone types in a highway, and if there is an additional safety zone type, a minimal risk maneuver type therefor may be added accordingly.

The stopping-in-safety zone may be performed when the vehicle 100 is capable of at least one of the braking control, the lateral control, the lane detection, and the shoulder detection.

If necessary, the vehicle 100 may select and perform one of the minimal risk maneuver types shown in FIG. 2.

Figure 3:
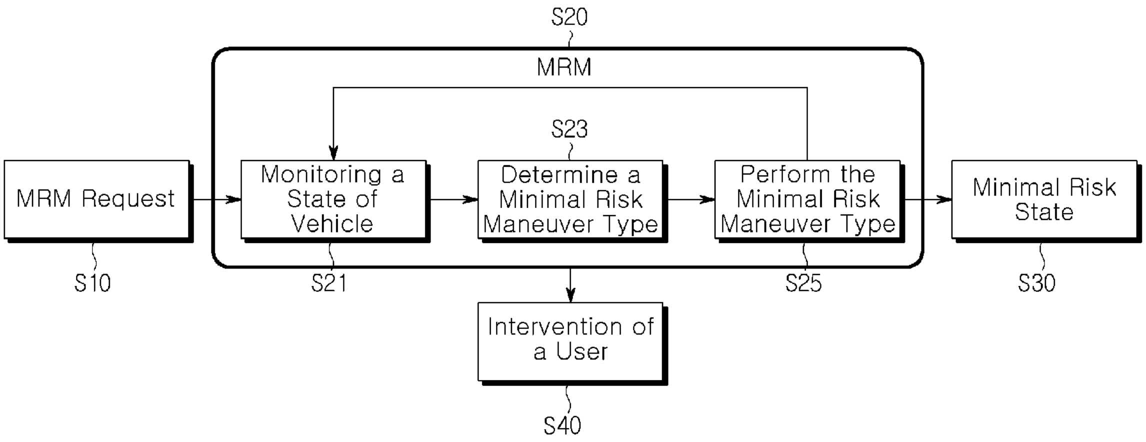
FIG. 3 is a flowchart illustrating an operation for performing a minimal risk maneuver of a vehicle according to various embodiments of the present disclosure.

FIG. 3 is a flowchart illustrating an operation for performing a minimal risk maneuver of a vehicle according to various embodiments of the present disclosure.

Referring to FIG. 3, in operation S10, the vehicle 100 may obtain a request to initiate a minimal risk maneuver (MRM). According to embodiments, the processor 130 may generate a request to initiate a minimal risk maneuver function when the vehicle 100 is turned on and the vehicle 100 starts to move at a predetermined speed or more. Alternatively, the processor 130 may obtain state information of the vehicle 100 and surroundings of the vehicle 100 and generate a minimal risk maneuver request based on the obtained state information. According to an embodiment, when it is determined that there is an abnormality in at least one state of the vehicle, a minimal risk maneuver request of the vehicle may be generated. Alternatively, the processor 130 may obtain a minimal risk maneuver request received from the outside through the communication device 150 or the sensor no. The minimal risk maneuver request may refer to any command that causes the vehicle 100 to perform a minimal risk maneuver.

In operation S20, the vehicle 100 may perform a minimal risk maneuver function when there is a minimal risk maneuver request.

The minimal risk maneuver function may include monitoring a state of the vehicle, determining a minimal risk maneuver type, and performing a minimal risk maneuver according to the determined minimal risk maneuver type.

In operation S21, the vehicle 100 may monitor a state of the vehicle 100. According to embodiments, the vehicle 100 may monitor states of the components and functions of the vehicle 100 required at least for driving the vehicle. According to an embodiment, the vehicle 100 may monitor whether to perform the braking control, the lateral control, the lane detection, the shoulder detection, etc. of the vehicle, using the sensor no or the like.

In operation S23, the vehicle 100 may determine a minimal risk maneuver type of the vehicle based on the monitored information. According to various embodiments, the vehicle 100 may determine whether to make the emergency-stopping or the stopping-in-safety zone.

When it is determined that the vehicle 100 makes the emergency-stopping, the vehicle 100 may additionally determine whether to make the straight-stopping (type 5) or the in-lane stopping (type 6). According to an embodiment, when the vehicle is capable of performing only the braking control, the vehicle may determine the straight-stopping (type 5) as a minimal risk maneuver type. According to another exemplary embodiment, when the vehicle is capable of performing at least the braking control, the lateral control, and the lane detection, the vehicle 100 may determine to make the in-lane stopping (type 6). In the case of a curved road, if the straight-stopping is made, the vehicle may possibly move out of its lane and enter another lane, and thus the risk may be greater than that of stopping within the lane. Accordingly, the vehicle 100 may determine to make the in-lane stopping as a minimal risk maneuver type.

When the vehicle 100 determines to perform the stopping-in-safety zone, the vehicle 100 may select an optimal safety zone and determine one of types 1 to 4 as the minimal risk maneuver type corresponding to the selected safety zone type.

Figure 4:
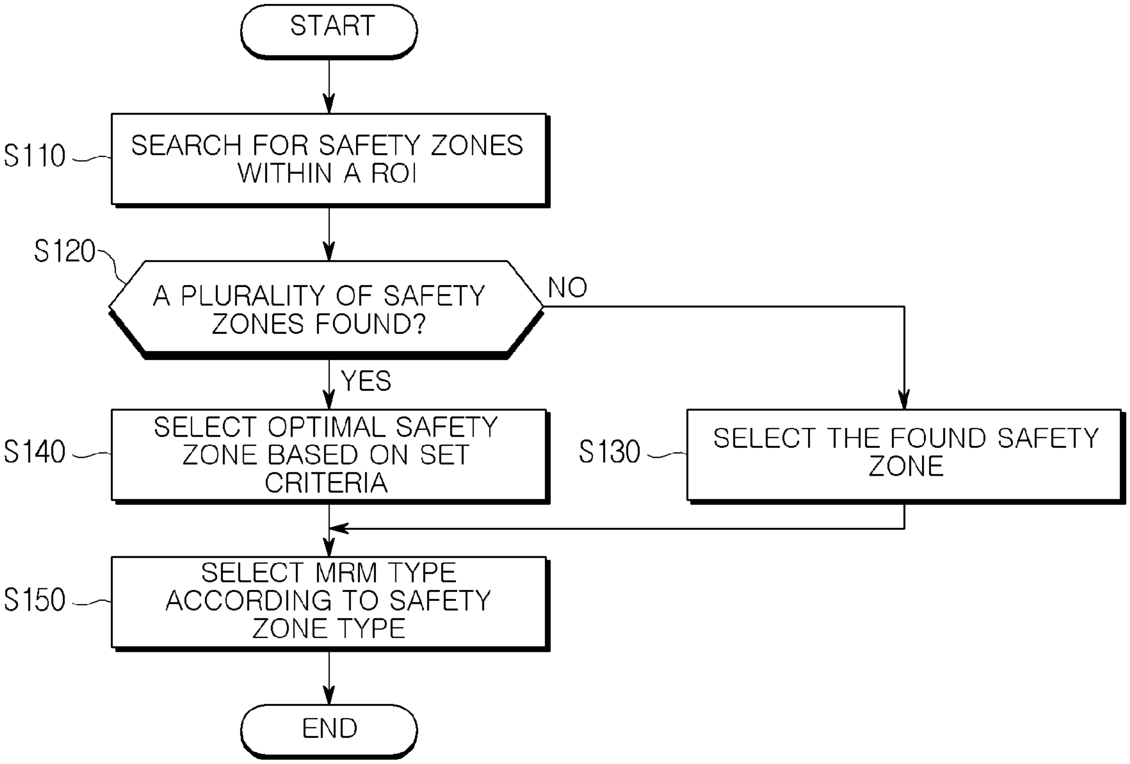
FIG. 4 is a flowchart illustrating a method of determining a minimal risk maneuver type when the vehicle determines to perform a stopping-in-safety zone.

FIG. 4 is a flowchart illustrating a method of determining a minimal risk maneuver type when the vehicle determines to perform a stopping-in-safety zone.

Referring to FIG. 4, in operation S110, when it is determined that the vehicle 100 performs the stopping-in-safety zone, the vehicle 100 may search for safety zones within a region of interest (ROI). That is, the vehicle 100 may search for safety zones such as a shoulder, a road merge point, and a highway entrance merge point as set in FIG. 2 within the region of interest. According to an embodiment, the vehicle 100 may preset safety zone types corresponding to executable minimal risk maneuver types and search only for the corresponding safety zone types.

It may be determined whether there are two or more safety zones in operation S120, and when only one safety zone is found, the found safety zone may be selected as a destination to stop in operation S130. When a plurality of safety zones is found, in operation S140, an optimal safety zone may be selected as a destination to stop according to the preset criteria.

In operation S150, a minimal risk maneuver type may be determined according to the selected safety zone type. According to an embodiment, when the selected safety zone type is a shoulder, one among the stopping-completely-on shoulder (type 1) and the stopping-half-on shoulder (type 2) may be selected. At this time, if a higher priority is given to a type that can have a minimal risk, the stopping-completely-on shoulder (type 1) rather than the stopping-half-on shoulder type (type 2) may be determined as a minimal risk maneuver type. According to another embodiment, the safety zone type selected in operation S120 or operation S130 may be a half of a shoulder or completely on a shoulder. Then, the stopping-half-on shoulder (type 2) or the stopping-completely-on shoulder (type 1) may be determined as the minimal risk maneuver type accordingly. According to another embodiment, when the selected safety zone type is a road merge point or a highway entrance merge point, the vehicle 100 may determine the stopping-on-road merge point (type 3) or the stopping-on-highway entrance merge point (type 4) as a minimal risk maneuver type.

Hereinafter, there are presented conditions for determining a safety zone for each safety zone type with regard to the safety zone search in operation S110.

Figure 5:
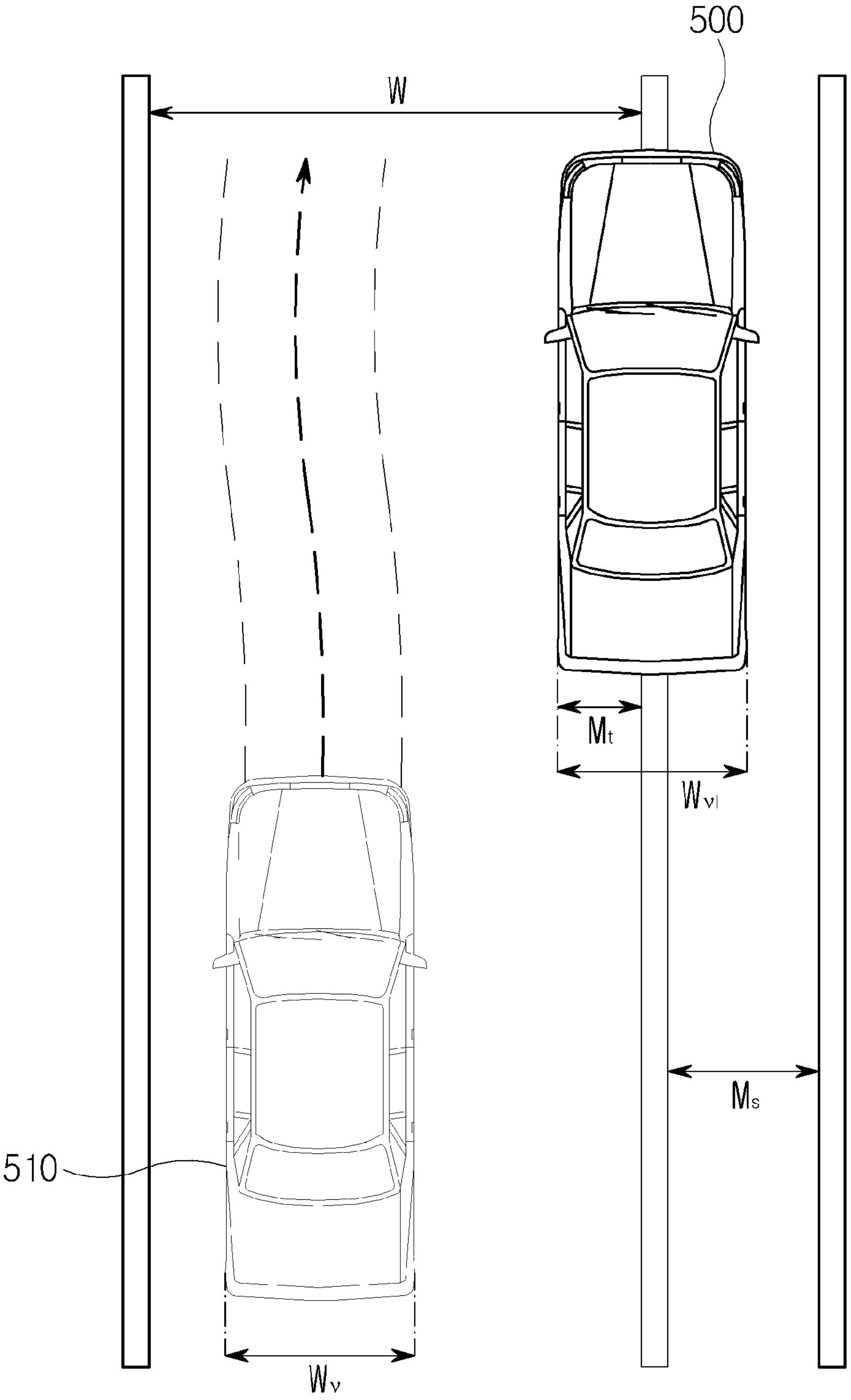
FIG. 5 is a view for explaining an example of determining a safety zone for a case of a shoulder.

FIG. 5 is a view for explaining an example of determining a safety zone for a case of a shoulder.

Referring to FIG. 5, the vehicle 500 may stop in a safety zone of a shoulder. Here, the vehicle may stop completely within the shoulder or partially invading the shoulder. In a case where the vehicle 500 stops while invading a driving lane, there may be set the maximum allowable width n by which the stopped vehicle 500 is allowed to invade the driving lane. The maximum allowable width n may be defined as a width securing a lateral space where the vehicle 510 traveling in the driving lane can evade through a collision evasive lateral maneuver (CELM). According to an embodiment, the maximum allowable width M t needs to be less than a value obtained by subtracting a maximum width of the vehicle 510 traveling along the driving lane from a width W of the driving lane. That is, it may be $M_t<W-W_v$. According to another embodiment, it may be $M_t<(W-W_v)/2$ under the assumption that the vehicle 510 traveling along the driving lane travels along the center of the driving lane.

In addition, the shoulder may be determined as a safety zone when a width of the shoulder is greater than a preset threshold value. According to an embodiment, the preset threshold value may be determined as $W_{v1}-m_t+0.75$, and when the shoulder width $M_s$ is greater than the preset threshold value, it may be determined as a safety zone. In particular, when $M_s \geq W_{v1}+0.75$ is satisfied, it can be determined as a safety zone where the stopping-completely-on shoulder is possible. Here, $W_{v1}$ may be a value representing the width of the host vehicle.

Figure 6:
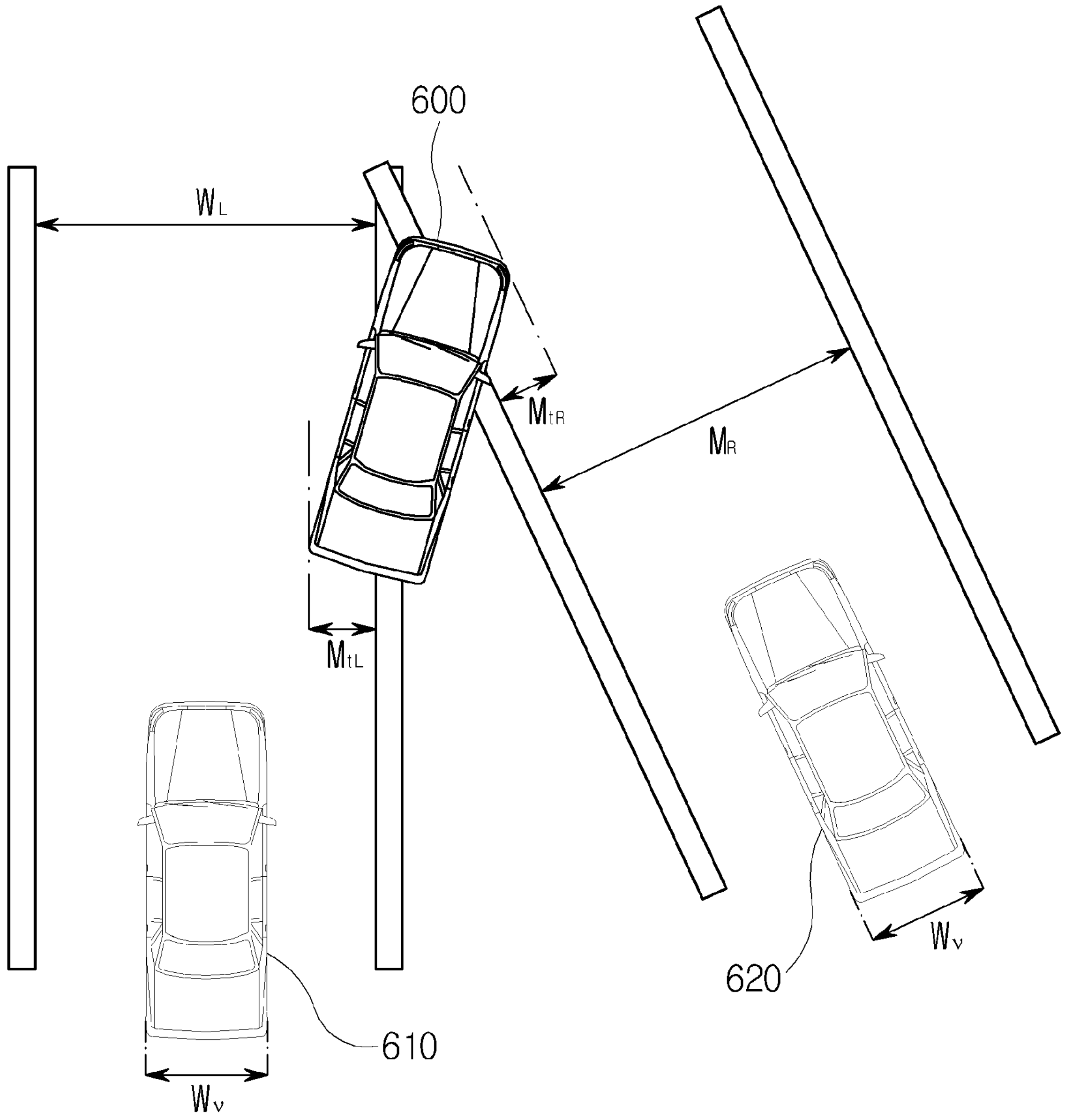
FIG. 6 is a view for explaining an example of determining a safety zone for a case of a road merge point.

FIG. 6 is a view for explaining an example of determining a safety zone for a case of a road merge point.

Referring to FIG. 6, the vehicle 600 may stop in an area where driving of the vehicle is not permitted near a road merge point where two roads traveling in the same direction join each other. According to an embodiment, there are shoulders on two roads that join each other, and the shoulders may join first before the road merge point. In addition, this area may be an area in which driving of a vehicle is not permitted.

Accordingly, the vehicle 600 may determine a safety zone when the width of the area that is before the road merge point and where the shoulders join and the driving of the vehicle is not allowed is greater than a preset value. That is, when the distance between the nearest driving lanes of the two roads before the road merge point is greater than the preset value, the vehicle 600 may determine it as a safety zone. In this case, the distance between the nearest driving lanes of the two roads may be a distance between adjacent outer lines (e.g., a line for distinguishing from a shoulder) of each driving lane.

According to another embodiment, as shown in FIG. 6, the width of the area in which the driving of the vehicle is not allowed may increase as it is far away from the road merge point. In this case, the vehicle 600 may determine a safety zone when, as an area that is within a preset distance from the road merge point and where driving of the vehicle is not allowed, the width thereof is greater than the preset value. Here, the vehicle 600 may stop while invading the driving lanes of the two roads, and there may be set the maximum allowable widths ($M_{t,L}$, $M_{t,R}$) that are allowed for the stopped vehicle 600 to invade both driving lanes. The maximum allowable width n may be set while satisfying a condition for allowing the vehicles 610 and 620 traveling in each driving lane to avoid the stopped vehicle without changing their lane.

According to an embodiment, the maximum allowable left width ($M_{t,L}$) needs to be less than a value obtained by subtracting the value of adding 0.75 m to the maximum width ($W_v$) of the vehicle 610 traveling along the driving lane from the width ($W_L$) of the left driving lane. That is, it may be $M_{t,L}<W_L-W_v-0.75$. The maximum allowable right width ($M_{t,R}$) needs to be less than a value obtained by subtracting the value of adding 0.75 m to the maximum width ($W_v$) of the vehicle 620 traveling along the driving lane and from the width ($W_R$) of the right driving lane. That is, it may be $M_{t,R}<W_R-W_v-0.75$. As an additional condition, the maximum allowable width may be less than 1 m. Then, it may be $M_{t,L}=\min(W_L-W_v-0.75, 1.0)$, and $M_{t,R}=\min(W_R-W_v-0.75, 1.0)$. Here, the "min" may mean a function that takes a smaller value among two numbers. Further, when $M_{t,L}$ or $M_{t,R}$ is smaller than 0 according to the above formula, $M_{t,L}$ or $M_{t,R}$ may be set to 0.

For the highway entrance merge point (type 4), similar to the stopping-on shoulder in FIG. 5, when a sum of the widths of the entry lane near the highway entrance merge point and the shoulder next to the entry lane is greater than a preset threshold, it may be determined as a safety zone, or additionally, for the highway entrance merge point, it may be determined as a safety zone only when it is within a preset distance from the final merge point. Here, the final merge point may mean a point where the entry lane merges with a driving lane and is thus ended, that is, an end area or an extinction point of the entry lane.

Referring back to FIG. 4, when a plurality of safety zones is found in operation S120, an optimal safety zone may be selected based on the criteria set in operation S140.

One embodiment of the criteria for selecting the optimal safety zone in operation S140 may be a distance from the region of interest to the safety zone. According to an embodiment, a safety zone closest to the current vehicle location may be selected with priority.

Priorities between types can be set in advance based on different criteria, and an optimal safety zone can be selected according to the priority. According to an embodiment, the stopping-completely-on shoulder may reflect a higher priority than the stopping-half-on shoulder. In addition, the stopping-half-on shoulder may reflect higher priority than the stopping-on-road merge point and the stopping-on-highway entrance merge point, and the stopping-on-road merge point and the stopping-on-highway entrance merge point may have the same priority.

According to this, even if the distance from the vehicle is greater, a safety zone where the stopping-completely-on shoulder is possible may be preferred over a safety zone where the stopping-half-on shoulder is possible, and thus is selected.

As another criterion, the optimal safety zone can be selected by reflecting both the priority between types and the distance. According to an embodiment, if a distance that the vehicle can travel is determined based a state of the vehicle, a safety zone having a higher priority may be selected within the corresponding distance.

The method of selecting the optimal safety zone is not limited to the method suggested above, and the optimal safety zone may be selected by additional various methods according to the driving situation of the vehicle.

Referring back to FIG. 3, in operation S25, the vehicle 100 may perform the determined minimal risk maneuver type.

The vehicle 100 may perform at least one of stopping the vehicle, controlling the vehicle's steering, keeping the lane, providing visual, audible and tactile alerts, decelerating the vehicle, accelerating the vehicle, initiating/terminating autonomous driving, turning off the vehicle, transmitting an emergency signal, controlling an emergency light, warning of a speed reduction, controlling a brake light, transferring control authority to another passenger, and controlling remotely to perform a minimal risk maneuver type. For example, the processor 130 of the vehicle 100 may transmit a control command corresponding to the determined minimal risk maneuver type to the controller 120, and the controller 120 may control the vehicle 100 according to the control command.

After the minimal risk maneuver type determined in operation S25 is performed, in S30, the vehicle may come to a stop and may be in the minimal risk state. When the vehicle wo reaches the minimal risk state, the autonomous driving system may be turned off or the vehicle wo may be turned off.

In addition, during operation S20, the vehicle 100 may allow an intervention of a user (S40). Thus, when an intervention of a user has occurred, the vehicle 100 may stop the minimal risk maneuver function so the user can take over manipulation of the vehicle 100.

In embodiments of the present disclosure, when the vehicle is in a critical state due to an event such as a failure occurring during autonomous driving, the vehicle may perform a minimal risk maneuver function capable of minimizing the risk according to the above-described method. Accordingly, the vehicle can escape from danger and its state can be changed to a state of minimum criticalness, and thereby driving stability of the vehicle can be further increased.

What is claimed is:

1. A method of operating a vehicle, the method comprising:

generating a minimal risk maneuver request of the vehicle in response to a determination that there is an abnormality in a state of the vehicle;

in response to the minimal risk maneuver request being generated, selecting a minimal risk maneuver type from among a plurality of minimal risk maneuver types based on the state of the vehicle to obtain a selected minimal risk maneuver type, wherein the plurality of minimal risk maneuver types comprises a stopping-in-safety zone type in which the vehicle stops after traveling to a safety zone; and controlling driving of the vehicle by performing a minimal risk maneuver based on the selected minimal risk maneuver type, wherein selecting the minimal risk maneuver type from among the plurality of minimal risk maneuver types comprises:

searching for safety zones to obtain found safety zones;

selecting one safety zone among the found safety zones to obtain a selected one safety zone; and selecting the minimal risk maneuver type according to a type of the selected one safety zone, and wherein searching for the safety zones comprises:

determining a road merge point as one of the safety zones based on a first distance between nearest driving lanes of two roads before the road merge point being greater than a preset second threshold value and a second distance from the road merge point to a first location where the first distance is greater than the preset second threshold value being less than or equal to a preset third threshold value.

2. The method of claim 1, wherein the stopping-in-safety zone type comprises a stopping-completely-on shoulder type, a stopping-half-on shoulder type, a stopping-on-road merge point type, and a stopping-on-highway entrance merge point type.

3. The method of claim 1, wherein searching for the safety zones further comprises determining a shoulder as one of the safety zones based on a width of the shoulder being greater than a preset first threshold value.

4. The method of claim 1, wherein searching for the safety zones further comprises determining a highway entrance merge point as one of the safety zones based on a sum of widths of a shoulder and an entry lane being greater than a preset fourth threshold value and a third distance from a final merge point, where the entry lane merges with a driving lane and thus ends, to a second location where the sum is greater than the preset fourth threshold value is less than or equal to a preset fifth threshold value.

5. The method of claim 1, wherein searching for the safety zones further comprises searching for the safety zones only within a region of interest of the vehicle.

6. The method of claim 1, wherein selecting the one safety zone among the found safety zones comprises selecting a safety zone having a closest distance among the found safety zones.

7. The method of claim 1, wherein selecting the one safety zone among the found safety zones comprises selecting a safety zone having a highest priority among the found safety zones based on a priority set according to a type of the safety zone.

8. The method of claim 1, wherein:

the plurality of minimal risk maneuver types further comprises an emergency-stopping type in which the vehicle stops prior to traveling to the safety zone; and the emergency-stopping type comprises a straight-stopping type and an in-lane stopping type.

9. The method of claim 8, wherein selecting the one among the plurality of minimal risk maneuver types comprises:

selecting the stopping-in-safety zone type based on the vehicle being capable of performing a braking control, a lateral control, a lane detection, and a shoulder detection;

selecting the in-lane stopping type based on the vehicle being capable of performing the braking control and the lateral control but not the lane detection and the shoulder detection; and selecting the straight-stopping type based on the vehicle being capable of performing the braking control but not the lateral control, the lane detection, and the shoulder detection.

10. A vehicle, comprising:

a sensor configured to detect state information of components of the vehicle and surrounding environment information of the vehicle;

a processor configured to:

monitor a state of the vehicle based on information from the sensor and to control autonomous driving of the vehicle;

generate a minimal risk maneuver request of the vehicle in response to a determination that there is an abnormality in the state of the vehicle;

select a minimal risk maneuver type from among a plurality of minimal risk maneuver types based on the state of the vehicle in response to generation of the minimal risk maneuver request to obtain a selected minimal risk maneuver type, wherein the plurality of minimal risk maneuver types comprises a stopping-in-safety zone type in which the vehicle is configured to stop after traveling to a safety zone; and control driving of the vehicle by performing a minimal risk maneuver according to the selected minimal risk maneuver type, wherein, in order to select the minimal risk maneuver type from among the plurality of minimal risk maneuver types, the processor is further configured to:

search for safety zones to obtain found safety zones;

select one safety zone from among the found safety zones to obtain a selected one safety zone; and select the minimal risk maneuver type according to a type of the selected one safety zone; and a controller configured to control an operation of the vehicle according to a control of the processor, wherein the processor is further configured to:

determine a road merge point as one of the safety zones based on a first distance between nearest driving lanes of two roads before the road merge point being greater than a preset second threshold value and a second distance from the road merge point to a first location where the first distance is greater than the preset second threshold value being less than or equal to a preset third threshold value.

11. The vehicle of claim 10, wherein the stopping-in-safety zone type comprises a stopping-completely-on shoulder type, a stopping-half-on shoulder type, a stopping-on-road merge point type, and a stopping-on-highway entrance merge point type.

12. The vehicle of claim 10, wherein the processor is configured to determine a highway entrance merge point as one of the safety zones based on a sum of widths of a shoulder and an entry lane being greater than a preset fourth threshold value and a third distance from a final merge point, where the entry lane merges with a driving lane and thus ends, to a second location where the sum is greater than the preset fourth threshold value is less than or equal to a preset fifth threshold value.

* * * * *